US007944114B2

(12) United States Patent
Yoshimura et al.

(10) Patent No.: US 7,944,114 B2
(45) Date of Patent: May 17, 2011

(54) ULTRASONIC TRANSDUCER DEVICE AND ULTRASONIC WAVE PROBE USING SAME

(75) Inventors: Yasuhiro Yoshimura, Kasumigaura (JP); Tatsuya Nagata, Ishioka (JP)

(73) Assignee: Hitachi, Ltd., Tokyo (JP)

( * ) Notice: Subject to any disclaimer, the term of this patent is extended or adjusted under 35 U.S.C. 154(b) by 547 days.

(21) Appl. No.: 12/119,567

(22) Filed: May 13, 2008

(65) Prior Publication Data

US 2008/0284287 A1 Nov. 20, 2008

(30) Foreign Application Priority Data

May 14, 2007 (JP) ................................ 2007-128020

(51) Int. Cl.
*H02N 11/00* (2006.01)
*H04R 25/00* (2006.01)

(52) U.S. Cl. ......... 310/309; 381/191; 367/181; 600/459

(58) Field of Classification Search .................. 310/309; 367/181; 600/459; 381/191
See application file for complete search history.

(56) References Cited

U.S. PATENT DOCUMENTS

| | | | | |
|---|---|---|---|---|
| 7,489,593 | B2 * | 2/2009 | Nguyen-Dinh et al. | 367/181 |
| 7,769,193 | B2 * | 8/2010 | Matsuzawa | 381/191 |
| 7,770,279 | B2 * | 8/2010 | Nguyen-Dinh et al. | 29/594 |
| 7,778,113 | B2 * | 8/2010 | Machida et al. | 367/181 |
| 2003/0087292 | A1 * | 5/2003 | Chen et al. | 435/6 |
| 2007/0195976 | A1 * | 8/2007 | Sekino et al. | 381/191 |
| 2008/0284287 | A1 * | 11/2008 | Yoshimura et al. | 310/365 |
| 2009/0189480 | A1 * | 7/2009 | Machida et al. | 310/300 |

FOREIGN PATENT DOCUMENTS

| | | |
|---|---|---|
| JP | 2003-500599 | 1/2003 |
| JP | 2006-211185 | 8/2006 |
| JP | 2006-352808 | 12/2006 |
| JP | 2007-74045 | 3/2007 |
| JP | 2007-74263 | 3/2007 |
| WO | WO 00/71894 A1 | 11/2000 |

* cited by examiner

*Primary Examiner* — Mark Budd

(74) *Attorney, Agent, or Firm* — Antonelli, Terry, Stout & Kraus, LLP.

(57) ABSTRACT

The present invention provides an ultrasonic transducer device to send and receive ultrasonic waves, comprising a semiconductor substrate, a lower electrode disposed on the semiconductor substrate, a gap disposed on the lower electrode, a third insulation film disposed on the gap, an upper electrode disposed on the third insulation film, a fourth insulation film disposed on the upper electrode, a wiring layer disposed on the fourth insulation film, and a fifth insulation film disposed on the wiring layer. The upper electrode is electrically connected to the wiring layer with penetrating wires.

11 Claims, 9 Drawing Sheets

ULTRASONIC TRANSDUCER DEVICE AND ULTRASONIC WAVE PROBE USING SAME

CLAIM OF PRIORITY

The present application claims priority from Japanese patent application serial No. 2007-128020, filed on May 14, 2007, the content of which is hereby incorporated by reference into this application.

FIELD OF THE INVENTION

The present invention relates to an ultrasonic transducer device to send and receive ultrasonic waves and an ultrasonic wave probe using the device.

RELATED ART

A conventional ultrasonic wave probe applied in the field of inspecting a specimen with ultrasonic waves is disclosed in JP-A No. 500599/2003, for example. The probe comprises a support, a gap (a hollow portion), an insulation layer, an upper electrode, and a protection film, which are disposed on a silicon substrate. The prove is structured so as to: apply DC voltage between the upper electrode and the silicon substrate and narrow the gap to a prescribed interval beforehand; further apply AC voltage and narrow the gap; and then stop the voltage application, return the gap to the original interval, and thereby transmit ultrasonic waves. Further, the probe combines the function of receiving the ultrasonic waves hitting and being reflected from a specimen and detecting capacitance change between the upper electrode and the silicon substrate.

JP-A No. 74263/2007 discloses a structure wherein: a protrusion of an insulation film is formed in a hollow layer formed on a first electrode; a membrane (an insulation film) surrounding the hollow layer is prevented from touching a lower electrode; and thereby electric charge is prevented from being injected into the membrane.

JP-A No. 352808/2006 discloses a technology of forming an electrode short-circuit prevention film on the hollow portion side of an upper electrode or a lower electrode and thus stabilizing the electroacoustic conversion characteristics of an electroacoustic conversion element.

JP-A No. 211185/2006 discloses a technology of attempting to improve the operation reliability of a capacitance-detection-type ultrasonic transducer by increasing the size of a lower electrode so as to be larger than that of a hollow layer.

JP-A No. 074045/2007 discloses a technology of inhibiting the drift of device characteristics by: disposing a hollow layer formed between an upper electrode and a lower electrode and a charge accumulation layer to accumulate charge given by the electrodes; and monitoring the accumulated charge amount.

SUMMARY OF THE INVENTION

It is necessary for an ultrasonic wave probe that sends and receives ultrasonic waves by electrostatic drive to contain ultrasonic transducers in a very dense state. For that reason, microfabrication based on the semiconductor manufacturing technology and the micro-electro-mechanical system (MEMS) technology is adopted. In the microfabrication technology, silicon is used as a substrate, an insulation film and a metallic film are laminated thereon, and a pattern is formed by photolithography or etching. As disclosed in JP-A No. 500599/2003, since an upper electrode oscillates when ultrasonic waves are sent and received, repeated stress is added, fatigue breakdown and creep deformation tend to occur, and the reliability of an ultrasonic transducer device is largely influenced.

An object of the present invention is to: provide a structure that can reduce fatigue breakdown and creep deformation of a drive electrode of an ultrasonic transducer device used in an ultrasonic wave probe that sends and receives ultrasonic waves by electrostatic drive and inspects a specimen; and enhance reliability.

In order to solve the above problems, the present invention provides an ultrasonic transducer device that: comprises a laminated body formed by laminating a semiconductor substrate, a lower electrode, a gap, a first insulation film, an upper electrode, a second insulation film, a wiring layer, and a third insulation film in sequence; is configured so as to apply voltage between the lower electrode and the upper electrode; and has a structure wherein the upper electrode is electrically connected to the wiring layer with penetrating wires.

In the ultrasonic transducer device according to the present invention, fatigue breakdown and creep deformation of the ultrasonic transducer device are reduced by: disposing a wiring layer on the center plane of stress caused by oscillation; electrically connecting the wiring layer to an upper electrode with penetrating wires disposed in the vicinity of the boundary point of a compressive stress field and a tensile stress field caused by the deformation of the ultrasonic transducer device caused by the oscillation; and thereby lowering the stress generated in the ultrasonic transducer device to the minimum.

As a concrete method thereof, there is the following method. In the method: an ultrasonic transducer device comprises a lower electrode disposed on a semiconductor substrate, a gap disposed on the lower electrode, a first insulation film disposed on the gap, an upper electrode disposed on the first insulation film, a second insulation film disposed on the upper electrode, a wiring layer disposed on a second insulation film, and a third insulation film disposed on the wiring layer; and the upper electrode is electrically connected to the wiring layer with penetrating wires. Further, the wiring layer is disposed on the center plane of stress (a stress center plane in the direction of the lamination of the upper and lower electrodes, the insulation films, and the gap) generated when the ultrasonic transducer device is operated and deforms. Furthermore, the penetrating wires are disposed in the vicinity of the boundary point of a compressive stress field (the center side of the plane) and a tensile stress field (outside the compressive stress field) generated in the planar direction of the ultrasonic transducer device. Here, the compressive stress field and the tensile stress field on the plane are interchanged with each other in accordance with the oscillation of the upper electrode.

By the present invention, it is possible to reduce fatigue breakdown and creep deformation of a drive electrode in an ultrasonic transducer device used in an ultrasonic wave probe that sends and receives ultrasonic waves and inspects a specimen by electrostatic drive. Further, it is possible to: provide a structure that increases withstand voltage; and enhance reliability when a thick film is used as the insulation film between a wire to supply electric power to the upper electrode and the lower electrode commonly used as the wire.

BRIEF DESCRIPTION OF THE DRAWINGS

FIGS. 2A and 2B are sectional views of ultrasonic transducer devices in an embodiment according to the present invention, in which FIG. 2A is a sectional view taken on line A-A in FIG. 1 and FIG. 2B is a sectional view taken on line B-B in FIG. 1;

DETAILED DESCRIPTION OF THE PREFERRED EMBODIMENTS

In an ultrasonic transducer device according to the present invention, when an upper electrode oscillates by a drive voltage applied between the upper electrode and a lower electrode, a first insulation film, a second insulation film, and a third insulation film on the upper electrode side also oscillate together with the upper electrode and thus repeated stress is caused. A wiring layer: needs a certain level of thickness in order to reduce electricity loss (a desirable range is 100 to 1,000 nm, particularly, 300 to 800 nm, for example); and deforms as a structure. Consequently, it is possible to reduce fatigue and creep deformation by forming the wiring layer on the stress center plane of the oscillatory deformation. On this occasion, stress is generated in the upper electrode and hence it is desirable that the upper electrode on the first insulation film is made of a creep-resistant material such as polysilicon, tungsten, or silicon-added titanium. Among such materials, the polysilicon is particularly desirable.

In the present invention, it is desirable that the upper electrode is as thin as possible, for example from several nm to several tens nm, and thereby it is possible to reduce creep deformation and fatigue breakdown.

Further, the upper electrode, even though it is made of a metal, may be a thin-film electrode since stress distribution is reduced as long as the thickness is sufficiently thin. Furthermore, with regard to the location of penetrating wires too, it is desirable to locate the penetrating wires so that stress fluctuation caused by oscillatory deformation may be reduced. In addition, it is desirable that the aforementioned electrode a round shape or a ring shape in consideration of the uniformity of deformation.

Embodiments according to the present invention are hereunder explained in reference to FIGS. 1 to 12.

Embodiment 1

Figure 1:
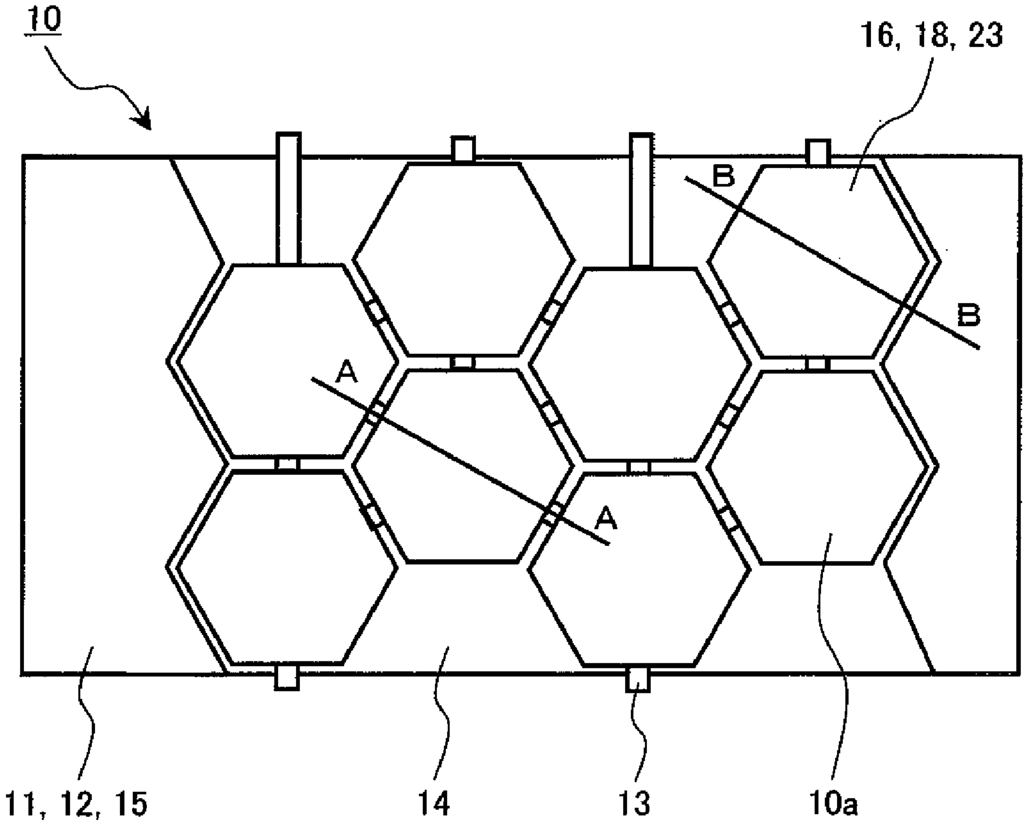
FIG. 1 is a top view of an ultrasonic wave probe in an embodiment according to the present invention.

FIG. 1 is a top view of an ultrasonic wave probe in an embodiment according to the present invention. As shown in FIG. 1, an ultrasonic transducer device 10 is configured by aligning plural ultrasonic transducer cells 10*a* in a very dense state (for example, ten thousands to several tens of thousands pieces/cm$^2$). The ultrasonic transducer device 10: is structured so as to have a gap 16 between an upper electrode 18 and a lower electrode 14; and sends and receives ultrasonic waves by applying an electric signal (voltage) between the upper electrode 18 and the lower electrode 14 and oscillating a membrane on the gap 16. Each upper electrode 18 is electrically connected to a wiring layer 23 with a wire 13 and the lower electrode 14 is formed on a substrate as a large membrane so as to extend to plural ultrasonic transducer cells 10*a*.

Other ultrasonic transducer cells are: also aligned around the eight ultrasonic transducer cells 10*a* shown in the figure; but omitted from the figure. Although the ultrasonic transducer cells 10*a* have a hexagonal shape in order to be aligned in a very dense state in the present embodiment, they may take a polygonal shape, a round shape or another shape.

Figure 2A:
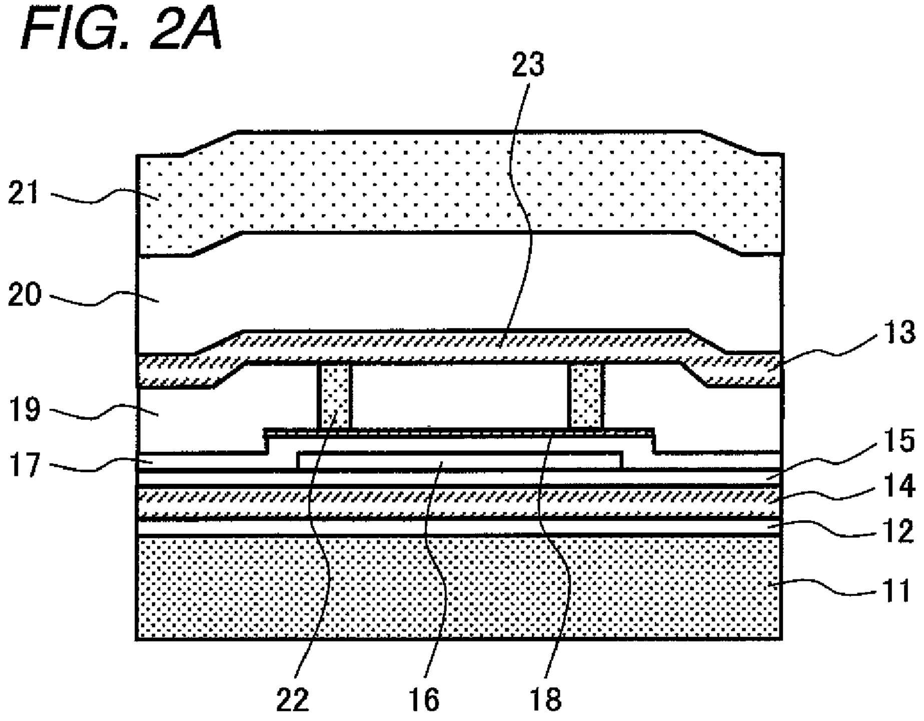
Figure 2B:
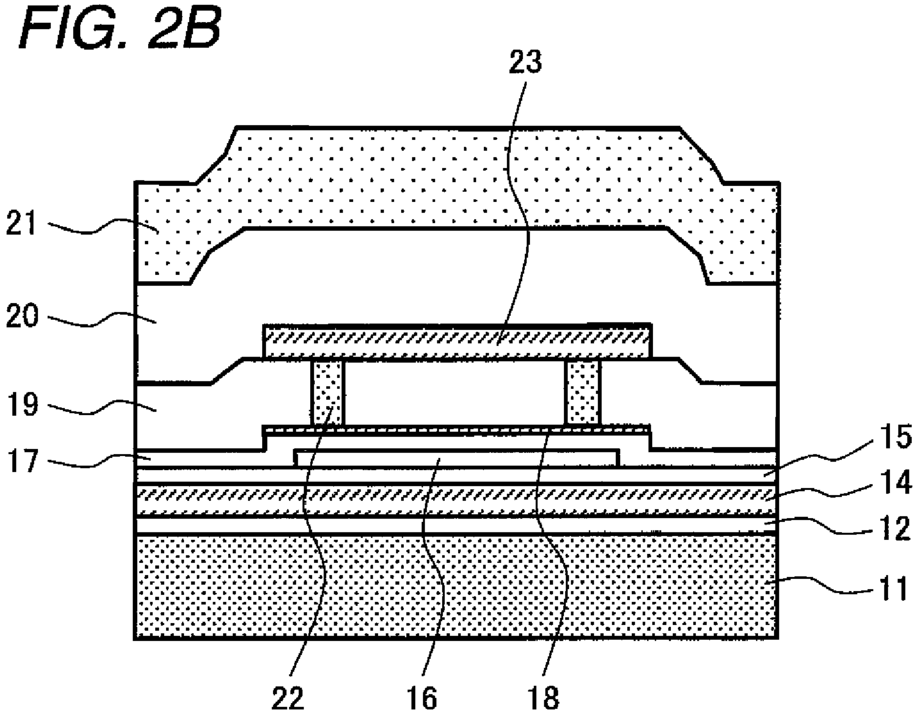

FIGS. 2A and 2B are a sectional view taken on line A-A and a sectional view taken on line B-B, respectively, in FIG. 1 showing an ultrasonic transducer device in an embodiment according to the present invention. As shown in FIGS. 2A and 2B, the ultrasonic transducer device 10 is configured by being provided with, on a silicon substrate 11: a fourth insulation film 12 to insulate the silicon substrate 11 from a lower electrode 14; the lower electrode 14 to transmit electric signals; an upper electrode 18; a wiring layer 23 and a wire 13; a fifth insulation film 15 to insulate the lower electrode 14 from the upper electrode 18; a gap 16 containing air or vacuum to oscillate a gap upper film; a third insulation film 17 to insulate the lower electrode 14 from the upper electrode 18; an upper electrode 18; a fourth insulation film 19 and a fifth insulation film 20 to reduce the displacement of the gap upper film; a wire 13 and penetrating wires 22 to transmit electric signals to the upper electrode 18; and a protective film 21 to protect the ultrasonic transducer device 10. Here, the first to third insulation films (17, 19, and 20) and the upper electrode 18 are collectively called a gap upper film.

Figure 12:
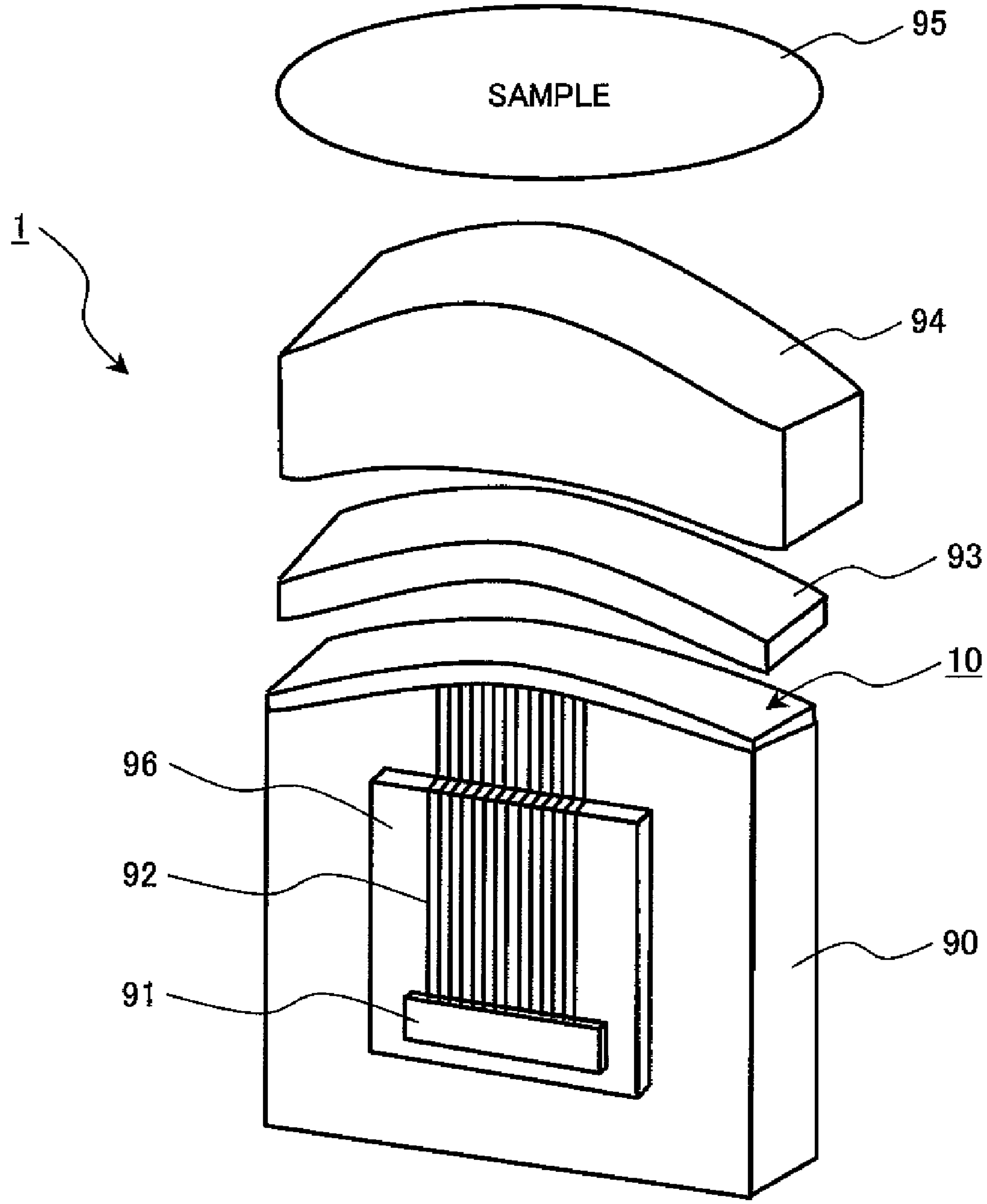
FIG. 12 is a development perspective view of an ultrasonic wave probe using an ultrasonic transducer device of an embodiment according to the present invention.

An ultrasonic wave probe 1 equipped with an ultrasonic transducer device 10 is shown in FIG. 12. The ultrasonic wave probe 1 is used for inspection of a human body (inspection of a circulatory organ such as a heart or a blood vessel, inspection of an abdomen, and others) in a medical institution. The ultrasonic wave probe 1 is equipped with an ultrasonic transducer device 10 at the tip of the main body 90 comprising a packing material and wires 92 leading to a connector 91 are connected to the ultrasonic transducer device 10. The connector 91 is connected to a flexible substrate 96 having the wires 92 connected to the ultrasonic transducer device 10 and the connector 91 on the flexible substrate 96 is connected to an external connection system (not shown in the figure). The external connection system (not shown in the figure) gives electric signals to the ultrasonic transducer device 10, drives it, and converts ultrasonic waves received from a specimen 95 into images. To the tip of the ultrasonic transducer device 10, a matching layer 93 that is made of silicon rubber or silicon resin and matches the acoustic absorption impedance with a specimen is attached.

Since the acoustic absorption impedance between the silicon of the ultrasonic transducer device 10 and the specimen is large, the reflection on the interface intensifies. In order to weaken the reflection, the matching layer 93 contains the silicon rubber or the silicon resin to match the acoustic absorption impedance.

An acoustic lens 94 made of silicon resin to focus ultrasonic waves generated from the ultrasonic transducer device 10 in the direction of a specimen is disposed on the tip of the matching layer 93. The ultrasonic transducer device 10 sends and receives ultrasonic waves to and from a specimen 95 such as a human body via the matching layer 93 and the acoustic lens 94. The ultrasonic transducer device 10, the matching layer 93, and the acoustic lens 94 are integrally laminated, those are contained in a case (not shown in the figure), and thereby an ultrasonic wave probe 1 is formed. Here, a part (the tip) of the acoustic lens 94 is exposed so as to touch the specimen 95.

Figure 3:
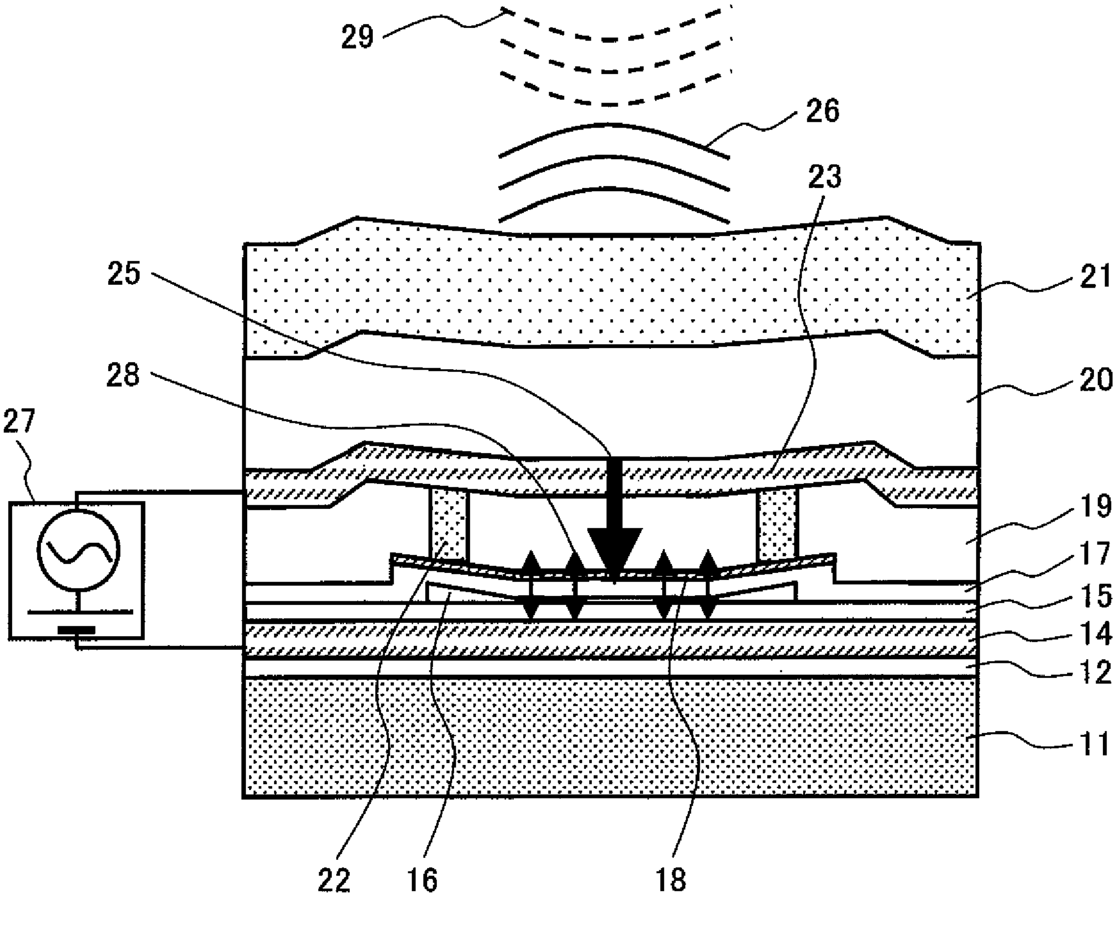
FIG. 3 is a view explaining a method for driving an ultrasonic transducer device in an embodiment according to the present invention.

The operation of sending and receiving ultrasonic waves is explained in reference to FIG. 3. In order to transmit supersonic waves, firstly DC voltage supplied from an electric power source 27 is applied between a lower electrode 14 and an upper electrode 18 (25) and thereby a gap 16 is narrowed to a prescribed interval by electrostatic force. In the state, the electric power source 27: further applies AC voltage between both the electrodes 14 and 18; generates electrostatic force 28 wherein the magnitude of amplitude oscillates; oscillates first, second, and third insulation films 17, 19, and 20, the upper electrode 18, and a wiring layer 23 above the gap 16; and thereby generates ultrasonic waves 26.

In the meantime, in order to receive ultrasonic waves, the gap 16 is deformed by the application of DC voltage 25 beforehand, the gap 16 expands and contracts by introducing the ultrasonic waves 29 reflected from a specimen into the gap 16, and thereby oscillation is induced to the upper films 17, 19, and 20, the upper electrode 18, and the wiring layer 23. On this occasion, the gap between the lower electrode 14 and the upper electrode 18 changes, thus the electrostatic capacitance changes, and AC current generated thereby is captured with a detecting circuit (not shown in the figure).

Figure 4:
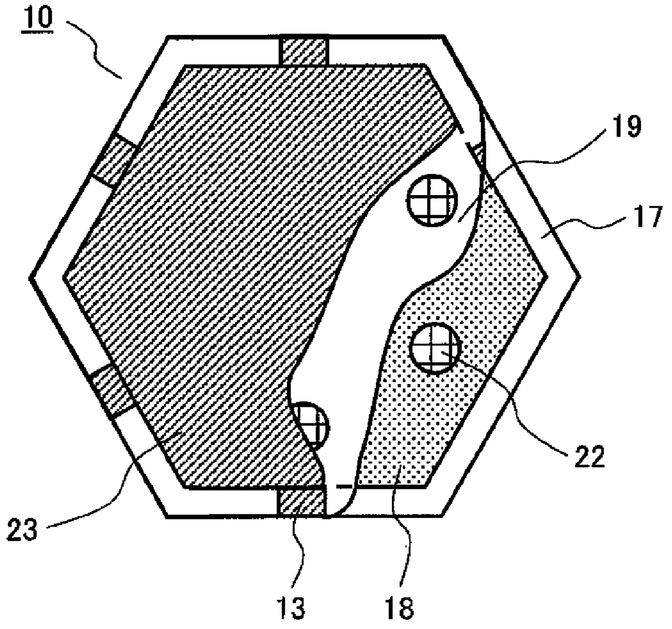
FIG. 4 is an exploded view showing the upper surface portion of an ultrasonic transducer device in an embodiment according to the present invention.

FIG. 4 is a partially exploded view of the upper surface of an ultrasonic transducer cell 10*a* in an ultrasonic transducer device of an embodiment according to the present invention. The wiring layer 23 has a hexagonal shape like the upper electrode 18. Each of penetrating wires 22 has a cylindrical shape. A preferable diameter of a penetrating wire in cross section is about 5 to 6 μm.

Figure 11:
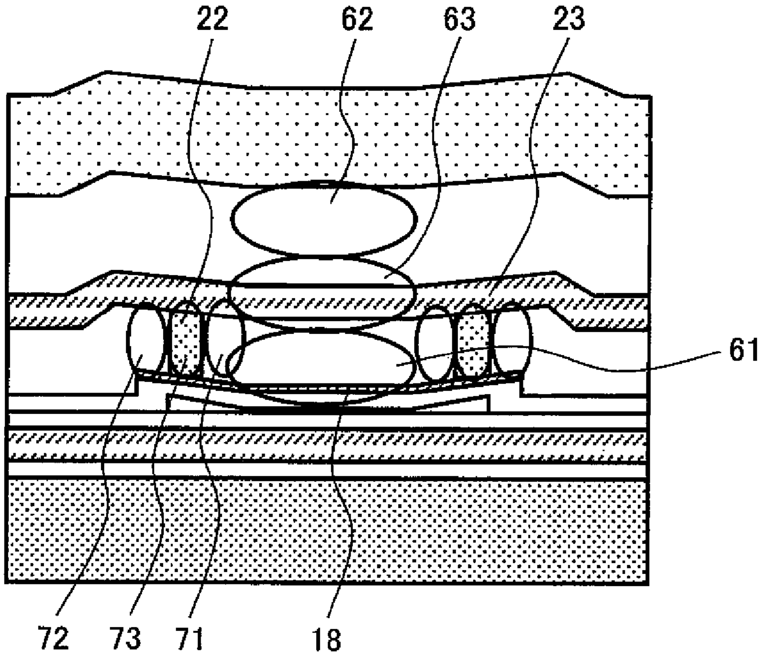
FIG. 11 is a view showing the state of stress when an ultrasonic transducer device of an embodiment according to the present invention is driven.

Here, the installation locations of the wiring layer 23 and the penetrating wires 22 are explained in reference to FIG. 11. In FIG. 3B of JP-A No. 74263/2007, drive voltage is applied between an upper electrode 307 and a lower electrode 302, and thereby an insulation film 305 surrounding a gap, an insulation film 308 surrounding the upper electrode, and an insulation film 301 surrounding the lower electrode are deformed by using the deformation of the gap formed between the electrodes. Then, when the gap narrows, stress is generated in the insulation films 308 and 305 located above and below the upper electrode, respectively. Since the deformation occurs in a relatively thick structure, a compressive stress field 62 is formed above the center in the thickness direction (stress center plane) and a tensile stress field 61 is formed below the center in the thickness direction.

Since the upper electrode oscillates vertically, the compressive stress field and the tensile stress field alternate in conformity with oscillation (in the figure, right and left of the penetrating wires on the stress center plane). Further, since the upper electrode and the wires are disposed in the tensile stress field, the variation of stress caused by drive of the upper electrode is large and the fatigue breakdown and the creep deformation of the electrode material tend to occur.

FIG. 11 is a sectional illustration explaining the structure and function of an ultrasonic transducer device of an embodiment according to the present invention. In the figure, since the wiring layer 23 is formed in the stress center field 63, the stress variation caused by the drive of the upper electrode 18 is small and it is possible to reduce the influence of fatigue breakdown and creep deformation.

Here, a creep-resistant material is desirable for the upper electrode 18 and polysilicon or tungsten is desirable in consideration of production processes. However, another material such as silicon-added titanium may be acceptable.

Successively, the installation locations of the penetrating wires 22 are explained. As shown in FIG. 3B of JP-A No. 74263/2007, the variation of stress is large in the vicinity of a place apart from the center of an ultrasonic transducer cell in the vertical direction and hence it is inappropriate to install a penetrating wire in such a vicinity. Meanwhile, at a place apart from the center of an ultrasonic transducer cell in the plane direction too, a tensile stress field 72 and a compressive stress field 71 appear alternately as shown in FIG. 11. For that reason, it is desirable to install a penetrating wire 22 at the midpoint 73 between the tensile stress field 72 and the compressive stress field 71 (or the vicinity of the boundary between the tensile stress field 72 and the compressive stress field 71). Here, the compressive stress field 71 and the tensile stress field 72 are formed by the deformation of the upper electrode 18, the insulation films 17 and 20, the wiring layer 23, and the gap 16.

Figure 13:
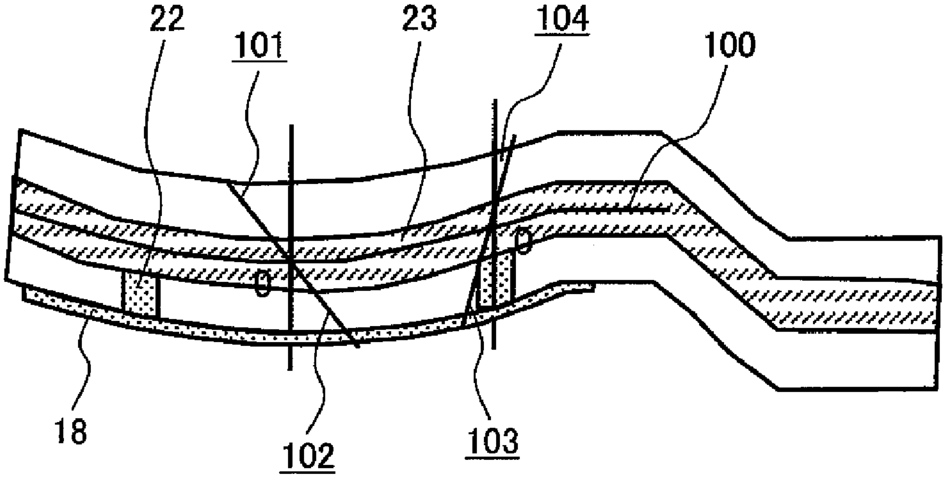
FIG. 13 is a sectional illustration showing the state of stress when an ultrasonic transducer device of an embodiment according to the present invention is driven.

FIG. 13 is a view illustratively showing the state of a stress field on the gap upper film explained in reference to FIG. 11. It shows the state where the gap upper film comes close to the lower electrode 14 and the compressive stress fields 101 and 103 and the tensile stress fields 102 and 104 appear on both the sides of the stress center plane 100, respectively. Consequently, the penetrating wire 22 exists in the center where the stress is the lowest.

Embodiment 2

Figure 5:
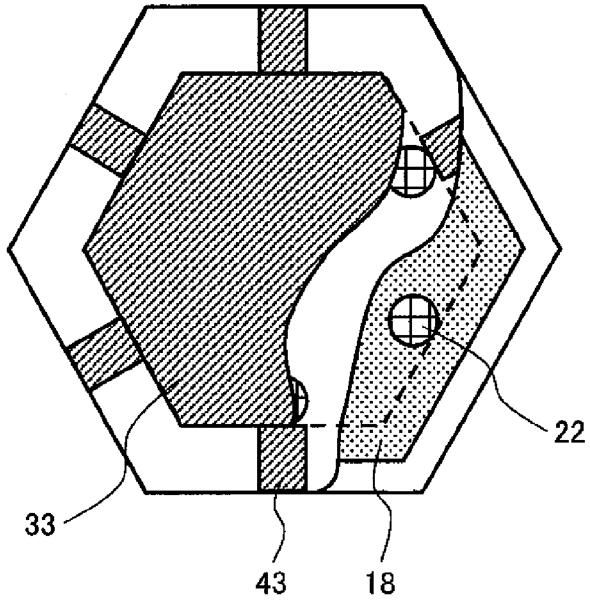
FIG. 5 is an exploded view showing the upper surface portion of an ultrasonic transducer device in another embodiment according to the present invention.

A second embodiment according to the present invention is shown in FIG. 5. The size of the wiring layer 33 is smaller than that of the upper electrode 18 to the extent that a penetrating wire 22 withdraws until the penetrating wire 22 is inscribed. The structure is formed by cutting the wiring layer that does not contribute to the drive of the upper electrode. As a result, excessive force to constrain the wiring layer and the insulation films is avoided and thus creep fatigue reduces.

Embodiment 3

Figure 6:
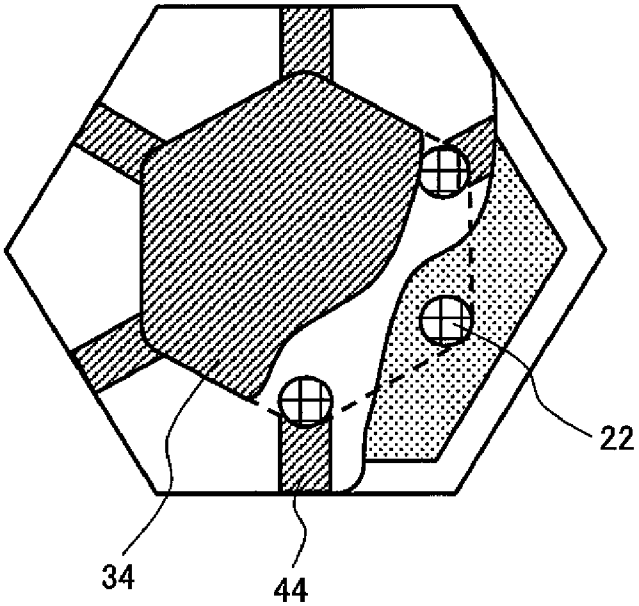
FIG. 6 is an exploded view showing the upper surface portion of an ultrasonic transducer device in yet another embodiment according to the present invention.

A third embodiment according to the present invention is shown in FIG. 6. The wiring layer 34 shows a hexagonal shape having penetrating wires 22 at the apexes. The structure is formed by further cutting the unnecessary part of the wiring layer 33 shown in FIG. 5. In this case too, effects similar to Embodiment 2 can be expected.

Embodiment 4

Figure 7:
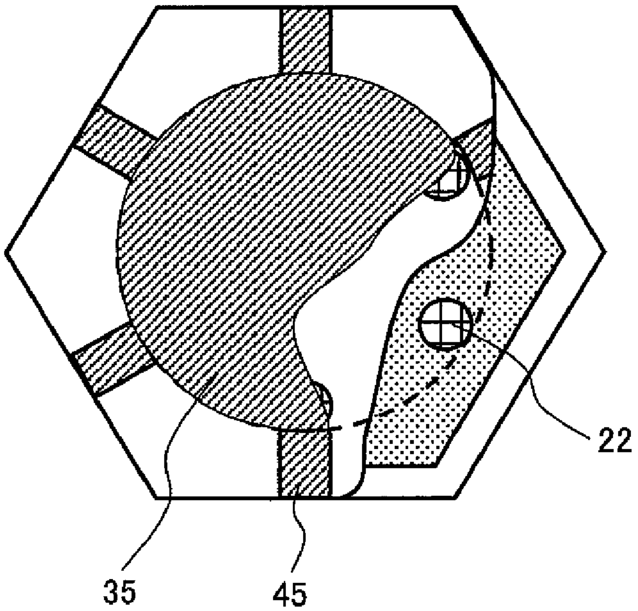
FIG. 7 is an exploded view showing the upper surface portion of an ultrasonic transducer device in still another embodiment according to the present invention.

A fourth embodiment according to the present invention is shown in FIG. 7. The wiring layer 35 has a round shape. The deformation caused by the drive of the upper electrode and the insulation films above and below the upper electrode is likely to be uniform. As a result, the variation of the gap caused by drive is stabilized and ultrasonic transmission characteristics are improved.

Embodiment 5

Figure 8:
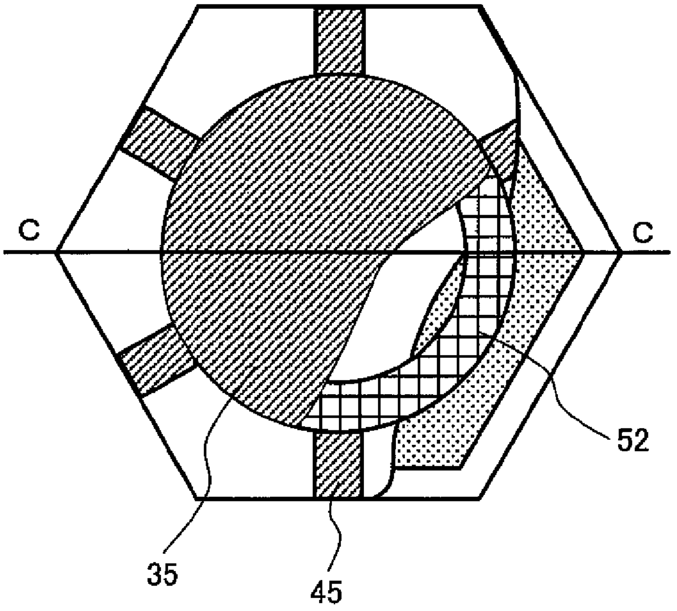
FIG. 8 is an exploded view showing the upper surface portion of an ultrasonic transducer device in still yet another embodiment according to the present invention.
Figure 10:
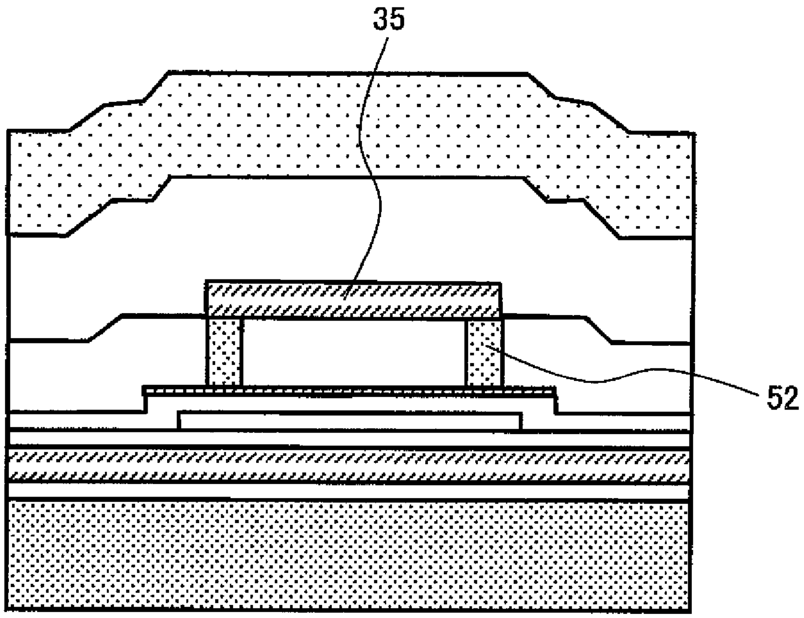
FIG. 10 is a sectional view taken on line C-C in FIG. 8 showing an ultrasonic transducer device in an embodiment according to the present invention.

A fifth embodiment according to the present invention is shown in FIG. 8. FIG. 10 is a sectional view taken on line C-C in FIG. 8. The wiring layer 35 has a round shape and further the penetrating wire 52 has a ring shape. As a result, the deformation caused by the drive of the upper electrode is further stabilized and ultrasonic transmission characteristics are improved. In addition, the production of an ultrasonic transducer device is facilitated.

Embodiment 6

Figure 9:
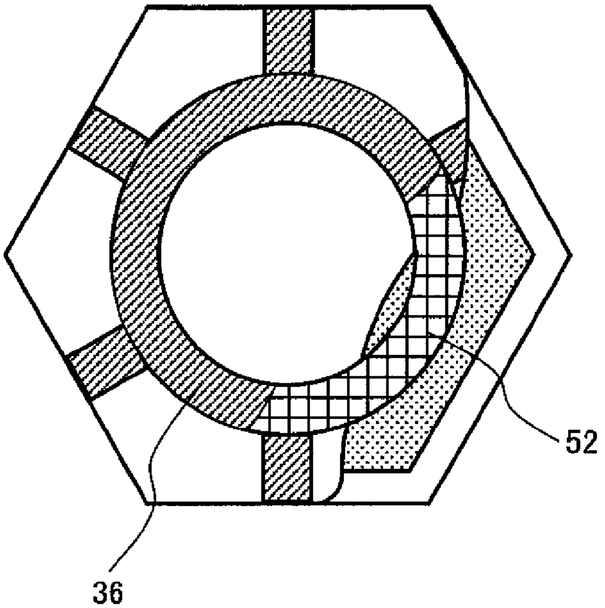
FIG. 9 is an exploded view showing the upper surface portion of an ultrasonic transducer device in another embodiment according to the present invention.

A sixth embodiment according to the present invention is shown in FIG. 9. The penetrating wire 52 has a ring shape. Further, the wiring layer 36 also has a ring shape. The structure is formed by cutting all the parts that do not contribute to the drive of the upper electrode.

The embodiments according to the present invention are explained above. The embodiments according to the present invention show that the thickness of the second insulation film between the wire 13 to transmit signals to the upper electrode 18 and supply electric power and the lower electrode 14 commonly used as a wire increases and hence the effect of increasing withstand voltage is obtained.

What is claimed is:

1. An ultrasonic transducer device, comprising a laminated body formed by laminating a semiconductor substrate, a lower electrode, a gap, a first insulation film, an upper electrode, a second insulation film, a wiring layer, and a third insulation film in sequence, wherein the ultrasonic transducer device is configured so as to apply voltage between said lower electrode and said upper electrode; and the ultrasonic transducer device has a structure in which said upper electrode is electrically connected to said wiring layer with penetrating wires.

2. The ultrasonic transducer device according to claim 1, wherein said wiring layer is disposed in the vicinity of a stress center plane in the direction of the lamination of said insulation films, said upper and lower electrodes, and said gap in said laminated body.

3. The ultrasonic transducer device according to claim 1, wherein said penetrating wires are disposed in the vicinity of the boundary between a compressive stress field and a tensile stress field in the center of stress in the direction parallel with the direction of the lamination of said insulation films, said upper and lower electrodes, and said gap in said laminated body.

4. An ultrasonic transducer device to send and receive ultrasonic waves, comprising:

a semiconductor substrate;

a lower electrode disposed on said semiconductor substrate;

a gap disposed on said lower electrode;

a first insulation film disposed on said gap;

an upper electrode disposed on said first insulation film;

a second insulation film disposed on said upper electrode;

a wiring layer disposed on said second insulation film; and a third insulation film disposed on said wiring layer, wherein said upper electrode is connected to said wiring layer with penetrating wires.

5. The ultrasonic transducer device according to claim 4, wherein said upper electrode is made of a creep-resistant material.

6. The ultrasonic transducer device according to claim 5, wherein said upper electrode is made of polysilicon, tungsten, or silicon-added titanium.

7. An ultrasonic transducer device to send and receive ultrasonic waves, comprising:

a semiconductor substrate;

a lower electrode disposed on said semiconductor substrate;

a gap disposed on said lower electrode;

a first insulation film disposed on said gap;

an upper electrode disposed on said first insulation film;

a second insulation film disposed on said upper electrode;

a wiring layer disposed on said second insulation film;

a third insulation film disposed on said wiring layer; and penetrating wires to connect said upper electrode to said wiring layer, wherein said wiring layer is formed in the vicinity of a center plane of stress generated in said second and third insulation films when said upper electrode is driven by applying voltage between said lower and upper electrodes.

8. The ultrasonic transducer device according to claim 7, wherein said penetrating wires are disposed at positions in the center of stress in the direction perpendicular to said upper electrode.

9. The ultrasonic transducer device according to claim 7 or 8, wherein the cross section of each of said penetrating wires has a round shape.

10. The ultrasonic transducer device according to claim 1, wherein said penetrating wire has a ring shape.

11. An ultrasonic wave probe, which is:

formed by integrally laminating an ultrasonic transducer device according to claim 1, a matching layer, and an acoustic lens in sequence; and provided with an external terminal connected to said ultrasonic transducer device.

* * * * *